US008445117B2

(12) United States Patent
Ding

(10) Patent No.: US 8,445,117 B2
(45) Date of Patent: May 21, 2013

(54) CORROSION AND WEAR-RESISTANT CLADDINGS

(75) Inventor: Hongbo Ding, Bridgewater, NJ (US)

(73) Assignee: Kennametal Inc., Latrobe, PA (US)

( * ) Notice: Subject to any disclaimer, the term of this patent is extended or adjusted under 35 U.S.C. 154(b) by 253 days.

(21) Appl. No.: 12/891,870

(22) Filed: Sep. 28, 2010

(65) Prior Publication Data
US 2012/0077058 A1 Mar. 29, 2012

(51) Int. Cl.
B32B 5/30 (2006.01)
B32B 15/16 (2006.01)
B32B 15/18 (2006.01)

(52) U.S. Cl.
USPC ........... 428/680; 428/564; 428/679; 428/457; 106/1.12; 106/1.15

(58) Field of Classification Search ........................ None
See application file for complete search history.

(56) References Cited

U.S. PATENT DOCUMENTS

| 3,743,566 | A |   | 7/1973 | Louthan et al. |
| 3,778,586 | A |   | 12/1973 | Breton et al. |
| 4,194,040 | A |   | 3/1980 | Breton et al. |
| 4,764,036 | A | * | 8/1988 | McPherson .................... 384/276 |
| 5,328,763 | A |   | 7/1994 | Terry |
| 5,662,183 | A | * | 9/1997 | Fang ............................. 175/374 |
| 5,791,422 | A | * | 8/1998 | Liang et al. ................... 175/374 |
| 5,921,330 | A | * | 7/1999 | Sue et al. ...................... 175/374 |
| 6,436,470 | B1 | * | 8/2002 | Iacocca et al. ................. 427/201 |
| 7,262,240 | B1 | * | 8/2007 | Breton et al. .................. 524/404 |
| 7,475,743 | B2 | * | 1/2009 | Liang et al. ................... 175/374 |
| 2003/0098090 | A1 | * | 5/2003 | Hallen et al. .................. 148/242 |
| 2007/0017160 | A1 |   | 1/2007 | Caldwell et al. |
| 2009/0120008 | A1 | * | 5/2009 | Lockwood et al. ............. 51/295 |
| 2009/0283331 | A1 | * | 11/2009 | Heath ......................... 175/325.2 |
| 2010/0009089 | A1 | * | 1/2010 | Junod et al. .................. 427/446 |
| 2010/0112374 | A1 | * | 5/2010 | Knauf ........................... 428/615 |
| 2010/0215983 | A1 | * | 8/2010 | Patel et al. .................... 428/679 |
| 2011/0042145 | A1 |   | 2/2011 | Xia et al. |
| 2011/0200838 | A1 | * | 8/2011 | Thomas et al. ............... 428/548 |

FOREIGN PATENT DOCUMENTS

| CN | 101658973 | | 3/2010 |
| DE | 10 2007 019 150 | * | 10/2008 |
| EP | 1 857 204 | * | 11/2007 |
| GB | 1070039 | | 5/1967 |
| GB | 1215889 | | 12/1970 |
| SU | 554980 | | 4/1977 |

* cited by examiner

Primary Examiner — Jennifer McNeil
Assistant Examiner — Jason Savage
(74) Attorney, Agent, or Firm — Matthew W. Gordon, Esq.

(57) ABSTRACT

The present invention discloses corrosion and wear-resistant claddings comprising hard particles and an alloying addition dispersed in a nickel-based alloy matrix. The alloying addition comprises at least one of molybdenum or copper. The cladding does not include cobalt-bonded tungsten carbide particles.

9 Claims, 1 Drawing Sheet

CORROSION AND WEAR-RESISTANT CLADDINGS

FIELD OF THE INVENTION

The invention relates to claddings, and more particularly is directed to wear resistant claddings having improved corrosion resistance and a method of manufacturing thereof.

BACKGROUND INFORMATION

Wear and corrosion are two factors that act to decrease the service life of equipment. One solution for increasing the wear resistance of tools or equipment is the application of a wear-resistant coating on an outer surface of a tool to provide additional protection. While this is helpful in increasing the service life of the tool from wear conditions, the tool is still susceptible to shorter service due to exposure to corrosive environments. In order to increase service life of equipment used in such environments, it is desirable to provide a cladding that is corrosion-resistant as well as wear-resistant in, for example, highly corrosive environments such as acidic environments.

SUMMARY OF THE INVENTION

The present invention provides an article comprising a substrate and a corrosion and wear-resistant cladding brazed on at least a portion of the substrate. The cladding may include hard particles and an alloying addition dispersed in a nickel-based alloy matrix. The alloying addition may include at least one of molybdenum or copper. The alloying addition may include molybdenum and copper. The cladding may include from about 2 to 4% by weight molybdenum of the total weight of the cladding and/or may include from about 1 to 3% by weight copper of the total weight of the cladding. The hard particles may include macro-crystalline tungsten carbide particles and non-macro-crystalline tungsten carbide particles. The non-macro-crystalline tungsten carbide particles may be from about 2 to 5 μm in size. The cladding may include from about 40 to 70% by weight macro-crystalline tungsten carbide particles of the total weight of the cladding. The cladding does not include cobalt-bonded tungsten carbide particles. The cladding may have a thickness from about 0.003 inches to about 0.100 inches. The substrate may be carbon and alloy steels, nickel, stainless steel, cobalt, nickel-based alloys, and cobalt-based alloys.

An aspect of the present invention provides a corrosion and wear-resistant cladding including hard particles and an alloying addition dispersed in a nickel-based alloy matrix, wherein the alloying addition comprises at least one of molybdenum or copper and the cladding does not include cobalt-bonded tungsten carbide particles. The hard particles may include from about 40 to 70% by weight macro-crystalline tungsten carbide particles and from about 5 to 30% by weight tungsten carbide particles of from about 2 to 5 μm in size. The hard particles may include from about 40 to 50% by weight macro-crystalline tungsten carbide particles and from about 10 to 20% by weight tungsten carbide particles of from about 2 to 5 μm in size. The alloying addition may include up to 10% by weight of the total weight of the cladding and may further include about 2 to 4% by weight molybdenum and from about 1 to about 3% by weight copper. The cladding may comprise 40 to 70% by weight of macro-crystalline tungsten carbide; 5 to 30% by weight of tungsten carbide particles having a size of 2 to 5 μm; 2 to 4% by weight of molybdenum, 1 to 3% by weight copper, 1 to 5% by weight boron, 0 to 20% by weight of chromium, up to 50% by weight nickel, up to 1% by weight of tungsten, and less than 2% by weight of impurities such as iron.

Yet another aspect of the present invention provides a method of cladding a substrate. The method includes applying a film on a substrate and heating the film and the substrate to form a brazed cladding thereon. The film may include a nickel-based filler alloy, hard particles and an alloying addition comprising at least one of molybdenum and copper. In the method, heating the film and the substrate includes melting the nickel-based filler alloy to form the brazed cladding on the substrate. The hard particles may include macro-crystalline tungsten carbide particles and non-macro-crystalline tungsten carbide particles. The alloying addition may include from 2 to 4% by weight molybdenum and 1 to 3% by weight copper. The hard particles comprise from about 40 to 70% by weight macro-crystalline tungsten carbide particles and from about 5 to 30% by weight tungsten carbide particles of 2 to 5 μm.

These and other aspects of the present invention will be more apparent from the following description.

DETAILED DESCRIPTION OF PREFERRED EMBODIMENT

Figure 1:
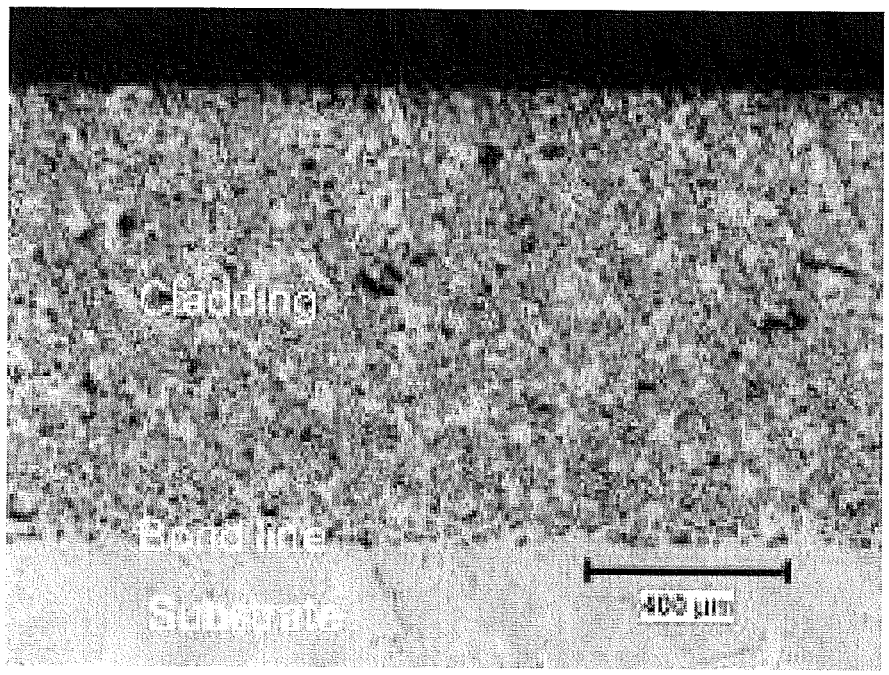
FIG. 1 is an optical microscope image of a microstructure of a cladding of the invention.

Before the present methods and materials are described, it is to be understood that this disclosure is not limited to the particular methodologies and materials described, as these may vary. It is also to be understood that the terminology used in the description is for the purpose of describing the particular versions or embodiments only, and is not intended to limit the scope. For example, as used herein and in the appended claims, the singular forms "a", "an", and "the" include plural references unless the context clearly dictates otherwise. For example, while reference is made herein to "a" cladding, "a" cloth and the like, one or more of these or any other components can be used. In addition, the word "comprising" as used herein is intended to mean "including but not limited to." "Cladding" as used herein is intended to mean a metal or alloy coating bonded onto another metal under high pressure and temperature. Unless defined otherwise, all technical and scientific terms used herein have the same meanings as commonly understood by one of ordinary skill in the art.

As used herein, unless otherwise expressly specified, all numbers such as those expressing values, ranges, amounts or percentages may be read as if prefaced by the word "about", even if the term does not expressly appear in the specification and claims. Also, any numerical ranges recited herein are intended to include all sub-ranges subsumed therein.

The inventive claddings are wear-resistant claddings having improved corrosion-resistance properties. In particular, the inventive claddings can be utilized on substrates having at least as good, if not better, corrosion resistance to that of the inventive cladding, which are exposed to corrosive and erosive environments. Such corrosive and erosive environments include for example, but are not limited to, acidic environments having a pH level of less than 7 and/or elevated temperatures.

In embodiments, the cladding comprises the following as a percentage of the total weight of the cladding: 40 to 70% by weight of macro-crystalline tungsten carbide; 5 to 30% by weight of tungsten carbide particles having a size of 2 to 5 μm; 2 to 4% by weight of molybdenum, 1 to 3% by weight copper, 1 to 5% by weight boron, 0 to 20% by weight of chromium, up to 50% by weight nickel, up to 1% by weight of tungsten, and less than 2% by weight of impurities such as iron.

The cladding may comprise hard particles, alloying additions, and a filler alloy. As used herein, the term "filler alloy" and "braze alloy" are used interchangeably and can be either a metal or an alloy as further described herein. The hard particles, alloying additions and filler alloy are applied to the substrate utilizing a flexible cloth, a slurry, or the like. In embodiments, the hard particles, alloying additions and filler alloy are applied together in the same flexible cloth. The flexible cloth as described further herein, may or may not have the same composition as that of the cladding. The flexible cloth or the like may be applied to the substrate with a low temperature adhesive.

In embodiments, alternating layers of cloth separately containing the hard particles, alloying additions and the filler alloy may be used to form the inventive claddings. For example, a carbide cloth having hard particles and alloying additions may be utilized in conjunction with a separate braze cloth containing the filler alloy. Alternatively, separate layers containing a combination thereof may be used. Such cloths may also include organic binders such as polymeric agents during processing. Suitable binders include, for example, polytetrafluoroethylene which is sold by Dupont under the name TEFLON. Other binders known to those skilled in the art may also be used. In embodiments, the carbide cloth and the braze cloth may include an organic binder which is removed during high temperature processing to form the inventive cladding.

The cladding is typically produced through an infiltration brazing process, where a porous structure of the hard particles and alloying additions are filled with the braze alloy. For example, the substrate with the layer(s) of cloth containing the hard particles, alloying additions and the filler alloy may be placed in a vacuum, an inert atmosphere furnace, or a reducing atmosphere furnace and then heated to a brazing temperature, i.e., above the liquidus temperature of the braze alloy but lower than that of the hard particles and alloying additions. The braze alloy has a relatively low melting point, which allows the brazing operation to be carried out at temperatures that do not adversely affect the substrate material. During the process, the braze alloy melts and infiltrates into the porous structure of the hard particles and alloying additions such that the braze alloy "fills" the structure by a capillary action and wets the substrate. A composite material of hard particles and alloying additions incorporated in the braze alloy matrix thereby forms the cladding that is metallurgically bonded to the substrate.

The hard particles in the cladding and/or the cloth may comprise carbides, nitrides, borides and/or carbonitrides. Other examples of suitable hard particles include one or more of tungsten carbide, vanadium carbide, niobium carbide, chromium carbide, titanium carbide, tantalum carbide, molybdenum carbide, hafnium carbide. Any other suitable hard particles which are compatible with a nickel braze material may be used in the invention.

In an embodiment, suitable hard particles are tungsten carbide particles. The tungsten carbide particles may include macro-crystalline tungsten carbide particles as well as non-macro-crystalline tungsten carbide particles. Macro-crystalline tungsten carbide particles are directly made from ore concentrate by a high-temperature thermit process. The size of the macro-crystalline tungsten carbide particles in the cladding are less than 50 μm, such as less than 44 μm, and such as −325 mesh. In other embodiments, the tungsten carbide particles of the cladding may include non-macro-crystalline tungsten carbide particles from 1 to 10 μm in size, such as 1 to 6 μm, or such as 2 to 5 μm. These particles may include, for example, an agglomeration of tungsten carbide single crystals or grains.

In embodiments, the hard particles used in the cladding of the invention may include a combination of macro-crystalline tungsten carbide particles and non-macro-crystalline tungsten carbide particles. For example, the cladding may include hard particles of 40 to 70% by weight of macro-crystalline tungsten carbide of the total weight of the cladding, such as 40 to 50% by weight, and further include 5 to 30% by weight, such as 10 to 20% by weight of tungsten carbide particles having a size of 2 to 5 μm. In other embodiments, the amount of hard particles used are such that the cladding has 43 to 49% by weight of macro-crystalline tungsten carbide particles and 10 to 20% by weight of tungsten carbide particles of 2 to 5 μm in size. While not being bound to one theory, the inventors have theorized that the use of pure tungsten carbide as opposed to, for example, cobalt-bonded tungsten carbide, aids in increasing the homogeneities of the as formed claddings, thereby increasing the corrosion resistance of the substrate. As such, the use of pure tungsten carbide ennobles the as-formed cladding by reducing and/or eliminating the amount of less noble elements, such as cobalt in the cladding. In preferred embodiments, the cladding does not include cobalt-bonded tungsten carbide particles.

The inventive cladding further comprises at least one alloying addition. Small amounts of alloying additions aid in increasing the corrosion resistance of the cladding when exposed to environments with a pH level of less than 7, such as a pH of 1. Such environments may include environments of reducing acids, such as hydrochloric acid, sulfuric acid and the like. The alloying additions may be discrete metal powders. The alloying additions are selected so as to increase the corrosion resistance of the cladding without deteriorating the wear resistance of the cladding. The alloying additions have a melting temperature higher than that of the filler alloy and therefore, do not adversely affect the infiltration process. The incorporation of the alloying additions with the filler alloy is expected to proceed through a diffusion process.

In embodiments, the cladding includes up to 10% by weight of alloying addition of the total weight of the cladding, such as up to 7% by weight, such as 2 to 5% by weight of alloying additions. Examples of the alloying additions include, but are not limited to molybdenum, copper, and the like. In certain embodiments, the alloying addition is a fine powder so as to facilitate the diffusion process. In particular, while not being bound to a specific theory, it is believed that the alloying addition diffuses into the filler alloy during brazing.

In embodiments, the cladding includes alloying additions of at least one of molybdenum or copper. In other embodiments, the alloying additions include molybdenum and copper. The cladding may include from 2 to 4% by weight molybdenum, such as 2% by weight of molybdenum. The cladding may include from 1 to 3% by weight copper, such as 2% by weight of copper.

The filler alloy used in the claddings may comprise a metal or alloy. The filler alloy may have a melting point of 1100° C., such as 1055° C. In an embodiment, the filler alloy may be a nickel-based alloy. As used herein, the term "nickel-based" alloy means an alloy comprising at least 50 weight % nickel. The nickel-based filler alloy may include alloying additions of boron and chromium. In one embodiment, the nickel-based filler alloy comprises from 0 to 20 weight % Cr, from 1 to 5 weight % B, and the balance Ni. In another embodiment, the nickel-based filler material used in the cladding of the present invention is a nickel-phosphorous braze alloy having the following composition: (1) 11 weight % P, and the remainder Ni and incidental impurities, or (2) 10 weight % P; 14 weight % Cr; and the remainder Ni and incidental impurities.

The weight ratio of the hard particles and alloying additions to the nickel-based filler alloy typically ranges from 1:0.5 to 1:2, such as 1:0.4 to 1:1.5. In embodiments, the weight ratio is from 1:0.4 to 1:0.7.

In embodiments, the braze matrix of the cladding (i.e., after brazing) may further include a phase suppressant. The cladding may include, for example, 2 to 10% by weight of the phase suppressant, such as 3 to 5% by weight. The phase suppressant acts functionally as well as aids in the processability or manufacturing of the cladding. The phase suppressant eliminates or minimizes the formation of certain deleterious phases in the Wc-Co system and also increases the corrosion resistance of the cladding. In an embodiment, the phase suppressant dissolves with the filler alloy, thereby aiding in increasing the corrosion resistance of the cladding.

The phase suppressant may be a metal or an alloy. For example, the phase suppressant may be a nickel-based alloy and/or may be similar to the braze alloy composition. In embodiments, the phase suppressant may have a composition of: 16 weight % Cr, 16 weight % Mo, 5 weight % Fe, 4 weight % W, 2.5 weight % Co, 1 weight % Mn, and the balance Ni and incidental impurities. In embodiments, the phase suppressant is chosen such that the cladding has 2 to 4% by weight molybdenum and/or 1 to 3% by weight of copper.

The cladding may be located on at least a portion of the substrate. In embodiments, the cladding may cover an entire outer surface area of the substrate. The substrate to be coated by the cladding of the invention can be any metallic article composed of metals or alloys such as various carbon and alloy steels, nickel, stainless steel, cobalt, and the like, as well as alloys such as nickel-based alloys, cobalt-based alloys, and the like. The substrate may have a melting point or solidus temperature higher than the filler alloy. The substrate preferably has a corrosion resistance at least as good or better than that of the inventive cladding.

In one embodiment of the invention, a first film or cloth comprising hard particles, alloying additions and an organic binder may be rolled to a predetermined thickness, forming a flexible cloth that maintains a uniform weight and readily conforms to the shape of the underlying substrate. In an embodiment, a composition of a first cloth or carbide cloth may include, in total weight of cladding, 65 to 75% by weight of macro-crystalline tungsten carbide particles; 15 to 20% by weight of tungsten carbide particles of 2 to 5 μm in size; 2 to 5% by weight molybdenum and/or 1 to 3% by weight of copper, 5 to 15% by weight phase suppressant, and 0.1 to 3% by weight of Teflon.

The cloth is then cut to shape and applied to the substrate, e.g., with a low temperature adhesive such as described in U.S. Pat. No. 4,194,040. A second film or cloth containing the filler alloy, for example, a braze cloth such as a nickel-based braze alloy powder and an organic binder is then applied onto the first layer. After the cloth layers are applied to the substrate, they are heated to a temperature above the liquidus of the filler or braze material to affect the metallurgical bonding of the hard particles and at least one alloying element together and to form a metallurgical bond to the substrate. The brazing temperature is below 1130° C., such as 950 to 1125° C. It should also be appreciated that the heating process to affect the metallurgical bonding may include multiple steps. The molten filler or braze alloy flows down into the hard particles by capillary action and forms an aggregate composite of hard particles of a Ni-based matrix that is metallurgically bonded to the substrate.

In another embodiment of the invention, a single, flexible film or cloth is made with a mixture of hard particles, alloying additions and the filler alloy and then applied to the substrate. Heating to a brazing temperature of the filler alloy, as described above, results in brazing of the hard particles and alloying element together and to the substrate.

In a further embodiment, the hard particles, the at least one alloying addition and the nickel-based filler may be applied to a substrate in the form of a slurry. The slurry may comprise a liquid carrier such as water and the ratio of particulate solids to liquid is selected as known and appreciated by one skilled in the art.

The cladding has a metallurgical bond strength in excess of 70,000 psi and is extremely resilient to chipping, cracking and flaking. The composition of the hard particles and the at least one alloying addition provides high wear resistance and corrosion resistance and the composition of the filler alloy provides ductility to the cladding.

The corrosion resistance of the cladding can be measured by material loss, for example, in mpy (mills per year) in accordance with ASTM G31 Procedure Corrosion Test. The inventive claddings are at least 2 times more corrosion resistant than claddings using cobalt-bonded tungsten carbide, such as 2 to 6 times more corrosion resistant. Depending on the concentration of the corrosion medium. The claddings of the present invention have been found to possess high abrasion resistance as well. For example, the abrasion resistance of the present claddings typically exceeds 50 ARF in accordance with ASTM G65 Procedure Abrasion Test, and may range from 60 to 130 ARF or higher. Additionally, the claddings of the invention are at least twice as abrasion resistant as the substrate, typically at least 3 to 5 times more abrasion resistant.

EXAMPLES

The following example is intended to illustrate the invention and should not be construed as limiting the invention in any way.

The corrosion and wear resistance of the inventive cladding was tested and compared against three comparative claddings.

A brazed cladding of the present invention was formed on a nickel-based alloy substrate. A first layer, or as referred to in this example, a carbide cloth having the chemistry shown in Table 1 was used. The carbide cloth included macro-crystalline tungsten particles of −325 mesh, tungsten carbide particles having a particle size of 2 to 5 μm and molybdenum and copper. The molybdenum and copper particles were 2 to 3 microns in size. The phase suppressant used in the carbide cloth was a −325 mesh nickel alloy powder comprising about 16 weight % Cr, 16 weight % Mo, 5 weight % Fe, 4 weight % W, 2.5 weight % Co, 1 weight % Mn, and the balance Ni and incidental impurities. The carbide cloth thickness was 0.04 inches.

TABLE 1

Carbide Cloth Chemistry

| Cloth Component | Weight % |
| --- | --- |
| Macro-Crystalline Tungsten Carbide | 68 |
| 2 to 5 μm Tungsten Carbide | 17 |

TABLE 1-continued

Carbide Cloth Chemistry

| Cloth Component | Weight % |
|---|---|
| Mo | 4 |
| Cu | 2 |
| Nickel alloy | 8 |
| PTFE | 1 |

The second layer or filler alloy cloth used to form the cladding was Ni-14Cr-3.5B. A braze ratio of 0.48 was used.

The composition of the inventive cladding is shown in Table 2. Table 2 also includes three comparative cladding examples, Comparative Claddings A, B, and C, respectively. The composition of each cladding is in weight %.

TABLE 2

Final Cladding Composition

| Phases/Elements | Inventive (wt. %) | Comparative A (wt. %) | Comparative B (wt. %) | Comparative C (wt. %) |
|---|---|---|---|---|
| −325 WC from WC-8% Co | 0.00 | 18.64 | 31.18 | 31.80 |
| Cobalt | 0.14 | 2.02 | 2.94 | 2.84 |
| −325 Macrocrystalline Tungsten Carbide | 46.25 | 5.07 | 8.47 | 23.04 |
| 2-5 µm Tungsten Carbide | 11.56 | 21.93 | 10.60 | 7.88 |
| Nickel | 29.70 | 39.04 | 36.01 | 27.43 |
| Chromium | 5.77 | 8.06 | 7.14 | 5.20 |
| Boron | 1.14 | 1.29 | 1.32 | 1.11 |
| Molybdenum | 3.59 | 2.53 | 1.50 | 0.44 |
| Iron | 0.27 | 0.79 | 0.46 | 0.14 |
| Tungsten | 0.22 | 0.63 | 0.37 | 0.11 |
| Copper | 1.36 | | | |

Figure 2:
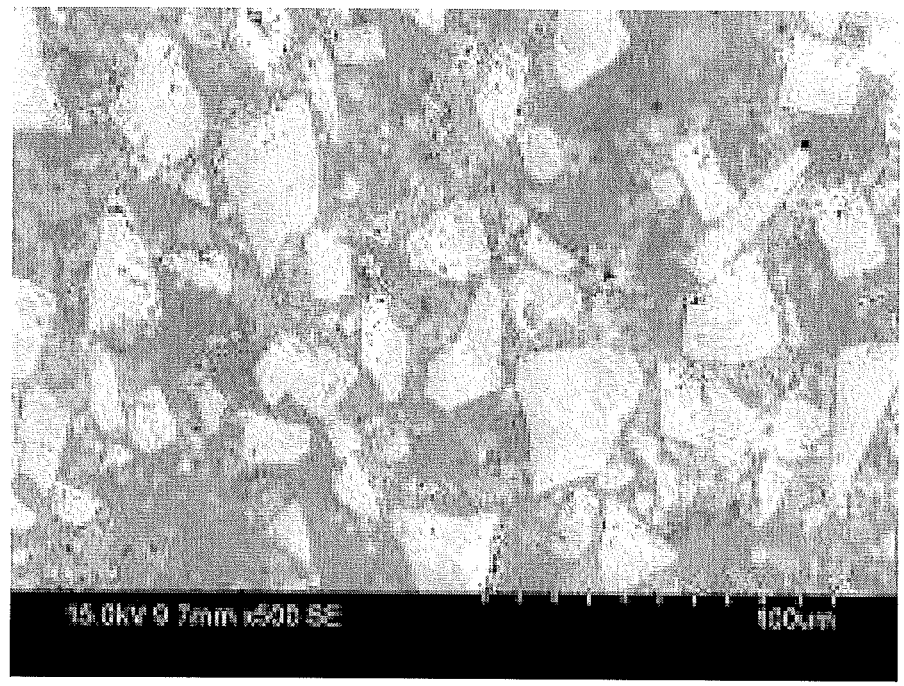
FIG. 2 is an electron microscope image of the microstructure of the cladding of FIG. 1.

The microstructure of the inventive cladding is illustrated in FIGS. 1 and 2. FIG. 1 is an optical microscope image of the microstructure and illustrates the cladding layer, bond line, and the substrate. FIG. 2 is an electron microscope image of the microstructure which illustrates the tungsten carbide particles in the nickel-alloy matrix. The abrasion resistance of the inventive cladding was 116.3 as tested by ASTM G65 (Standard Test Method for Measuring Abrasion Using the Dry Sand/Rubber Wheel). The abrasion resistance of the comparative claddings A, B, and C, was 85, 115, and 150, respectively, and therefore, the wear resistance of the inventive cladding was at least comparable to that of Comparative Claddings A, B, and C.

The substrates having the inventive and comparative claddings thereon were then placed in four varying corrosive environments, specifically, that of reducing acids and at high temperatures. The acids used were hydrochloric acid (HCl) and sulfuric acid ($H_2SO_4$), each at concentrations of 1 weight % and 10 weight %. These acids at the specified concentration and at boiling temperatures were used to simulate aggressive corrosion media.

The corrosion test conducted was ASTM G31 (Standard Practice for Laboratory Immersion Corrosion Testing of Metals). All tests were conducted at boiling temperatures of the corresponding acids. Table 3 shows the results with measured corrosion resistance as material loss, i.e., mills per year (mpy) of the inventive cladding with Comparative Claddings A, B, and C in each environment.

TABLE 3

| | Inventive | Comparative A | Comparative B | Comparative C |
|---|---|---|---|---|
| 1 wt. % HCl | 33 | 282 | 226 | 194 |
| 1 wt. % $H_2SO_4$ | 6.36 | 44 | 33 | 8.5 |
| 10 wt. % HCl | 521 | 1034 | 1348 | 1688 |
| 10 wt. % $H_2SO_4$ | 17 | 549 | 397 | 62 |

The inventive cladding as evidenced in Table 3 demonstrates that when exposed to all the corrosion environments, it had significantly lower corrosion rates (i.e., material loss) than Comparative Claddings A, B, and C. In 10 wt. % $H_2SO_4$ acid at boiling temperature, the corrosion rate of the inventive cladding was more than 30 times lower than Comparative A and nearly 4 times lower than Comparative C. Generally, the corrosion rates of all the claddings in $H_2SO_4$ is lower than that in HCl and the corrosion rate increases with increasing acid concentration.

The claddings of the invention can be used in any application requiring corrosion resistance as well as wear resistance. The corrosion-resistant claddings of the invention are suitable for applications that include exposure to corrosive and erosive environments, such as reducing acids. Examples of industries that include such environments include petrochemical, chemical, refinery, power generation and the like.

Examples for applications or substrates to which the inventive cladding can be applied on or used in conjunction with include but are not limited to pumps, agitators, fans, soot blowers, extruder barrels in, for example, the plastic extrusion industry, refinery pump components operating in acidic environments, pumps subjected to corrosion attack (due to acids) and erosion attack (due to fluids and/or solids within the fluid), boiler tubes and other components in waste-to-energy power generation, for example, subject to high corrosion and erosion attack and the like.

Whereas particular embodiments of this invention have been described above for purposes of illustration, it will be evident to those skilled in the art that numerous variations of the details of the present invention may be made without departing from the invention as defined in the appended claims.

What is claimed is:

1. An article comprising:
a substrate;
and a corrosion and wear-resistant cladding brazed on at least a portion of the substrate, wherein the cladding comprises hard particles and an alloying addition dispersed in a nickel-based alloy matrix, and
wherein the alloying addition comprises molybdenum in an amount of 2 to 4 percent by total weight of the cladding and wherein the nickel-based alloy matrix comprises iron in an amount less than 2 percent by total weight of the cladding.

2. The article of claim 1, wherein the cladding has a thickness from about 0.003 inches to about 0.100 inches.

3. The article of claim 1, wherein the substrate comprises carbon and alloy steels, nickel, stainless steel, cobalt, nickel-based alloys, and cobalt-based alloys.

4. The article of claim 1, wherein the hard particles comprise macro-crystalline tungsten carbide particles and non-macro-crystalline tungsten carbide particles.

5. The article of claim 4, wherein the cladding comprises from about 40 to 70% by total weight of the cladding macro-crystalline tungsten carbide particles.

6. The article of claim 4, wherein the non-macro-crystalline tungsten carbide particles are from about 2 to 5 µm in size.

7. The article of claim 4, wherein the cladding does not include cobalt-bonded tungsten carbide particles.

8. The article of claim 1, wherein the alloying addition further comprises copper in an amount of 1 to 3 percent by total weight of the cladding.

9. The article of claim 8, wherein the weight ratio of the hard particles and alloying addition to the nickel-based alloy matrix ranges from 1:0.5 to 1:2.

* * * * *